(12) United States Patent
Dugan

(10) Patent No.: US 10,028,622 B1
(45) Date of Patent: Jul. 24, 2018

(54) FOOD DRAINING ASSEMBLY

(71) Applicant: Darren Dugan, Naples, FL (US)

(72) Inventor: Darren Dugan, Naples, FL (US)

( * ) Notice: Subject to any disclaimer, the term of this patent is extended or adjusted under 35 U.S.C. 154(b) by 0 days.

(21) Appl. No.: 15/398,071

(22) Filed: Jan. 4, 2017

(51) Int. Cl.
*A47J 43/24* (2006.01)

(52) U.S. Cl.
CPC .................................... *A47J 43/24* (2013.01)

(58) Field of Classification Search
CPC ........................................................ A47J 43/24
USPC ....... 210/285, 473, 474, 477, 484, 470, 464, 210/465, 167.28, DIG. 8
See application file for complete search history.

(56) References Cited

U.S. PATENT DOCUMENTS

| 2,650,485 | A | 9/1953 | Greca |
| 3,989,158 | A | 11/1976 | Florian |
| 5,139,166 | A | 8/1992 | Smith |
| 6,276,555 | B1 | 8/2001 | Edwards |
| 7,487,881 | B2 | 2/2009 | Watzke et al. |
| D651,476 | S | 1/2012 | Hauser |
| 8,240,503 | B2 | 8/2012 | Curtin |
| 2003/0196940 | A1* | 10/2003 | Mullaney, Jr. ...... A47J 37/1223 210/167.28 |
| 2011/0303679 | A1 | 12/2011 | Yu |
| 2013/0313263 | A1 | 11/2013 | Parsia |

FOREIGN PATENT DOCUMENTS

WO    WO2005053470    6/2005

* cited by examiner

*Primary Examiner* — Madeline Gonzalez

(57) ABSTRACT

A food draining assembly for draining a foot item includes a housing that may be positioned on a support surface. A bowl is coupled to the housing and the bowl may contain a food item. The bowl has a plurality of drains to pass a liquid into the housing. A tray is slidably positioned in the housing to capture the liquid that passes through the drains.

4 Claims, 5 Drawing Sheets

FOOD DRAINING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to draining devices and more particularly pertains to a new draining device for draining a food item.

BRIEF SUMMARY OF THE INVENTION

An embodiment of the disclosure meets the needs presented above by generally comprising a housing that may be positioned on a support surface. A bowl is coupled to the housing and the bowl may contain a food item. The bowl has a plurality of drains to pass a liquid into the housing. A tray is slidably positioned in the housing to capture the liquid that passes through the drains.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
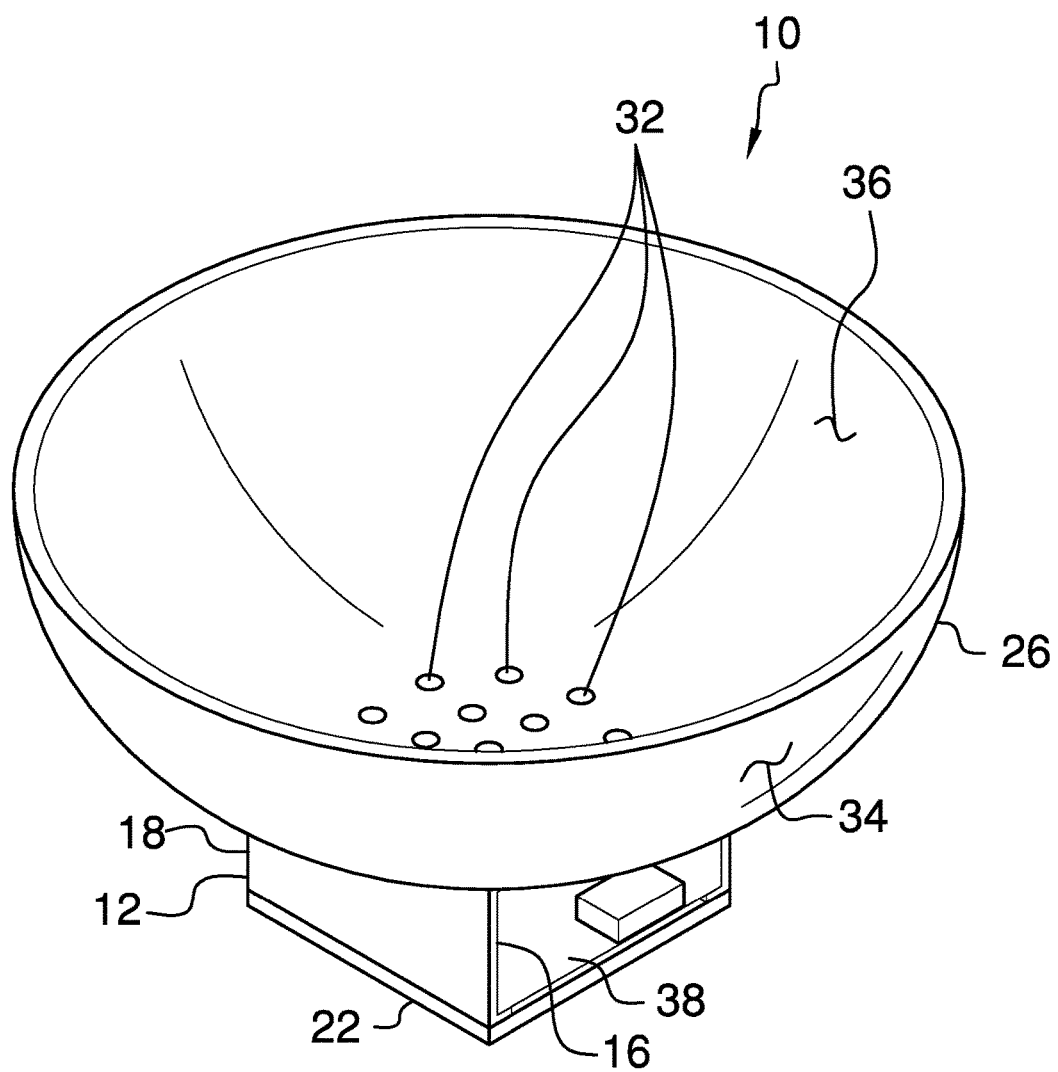
FIG. 1 is a top perspective view of a food draining assembly according to an embodiment of the disclosure.
Figure 2:
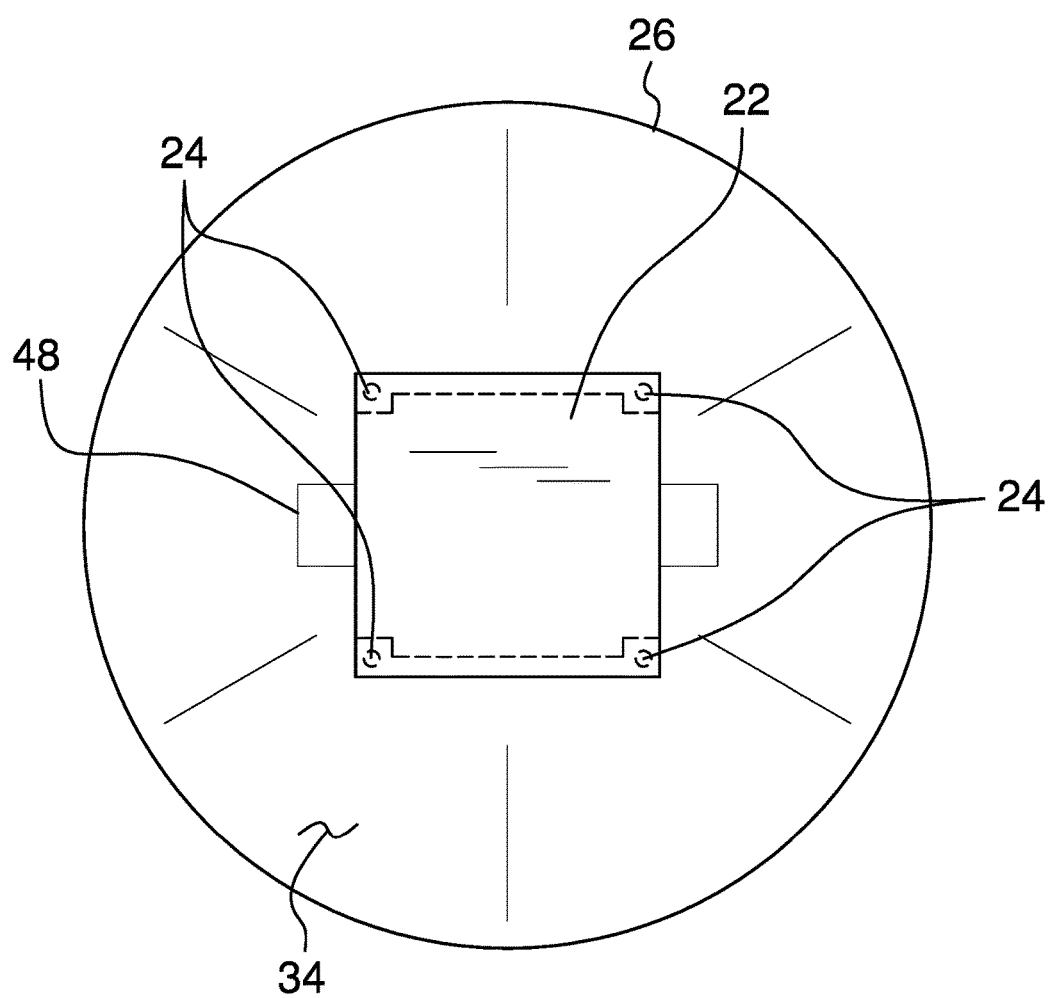
FIG. 2 is a bottom view of an embodiment of the disclosure.
Figure 3:
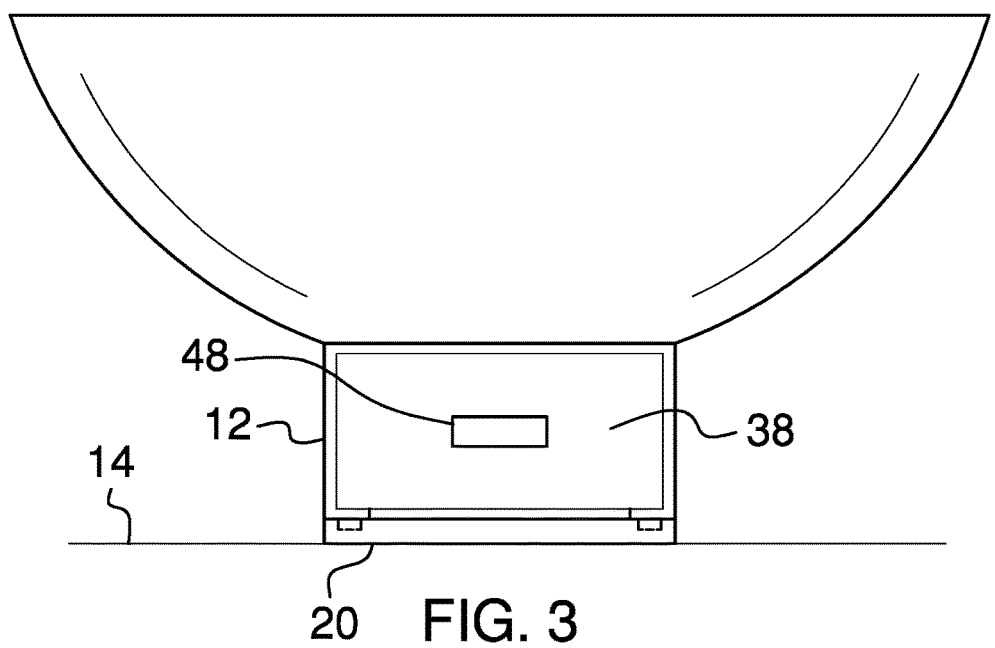
FIG. 3 is a front view of an embodiment of the disclosure.
Figure 4:
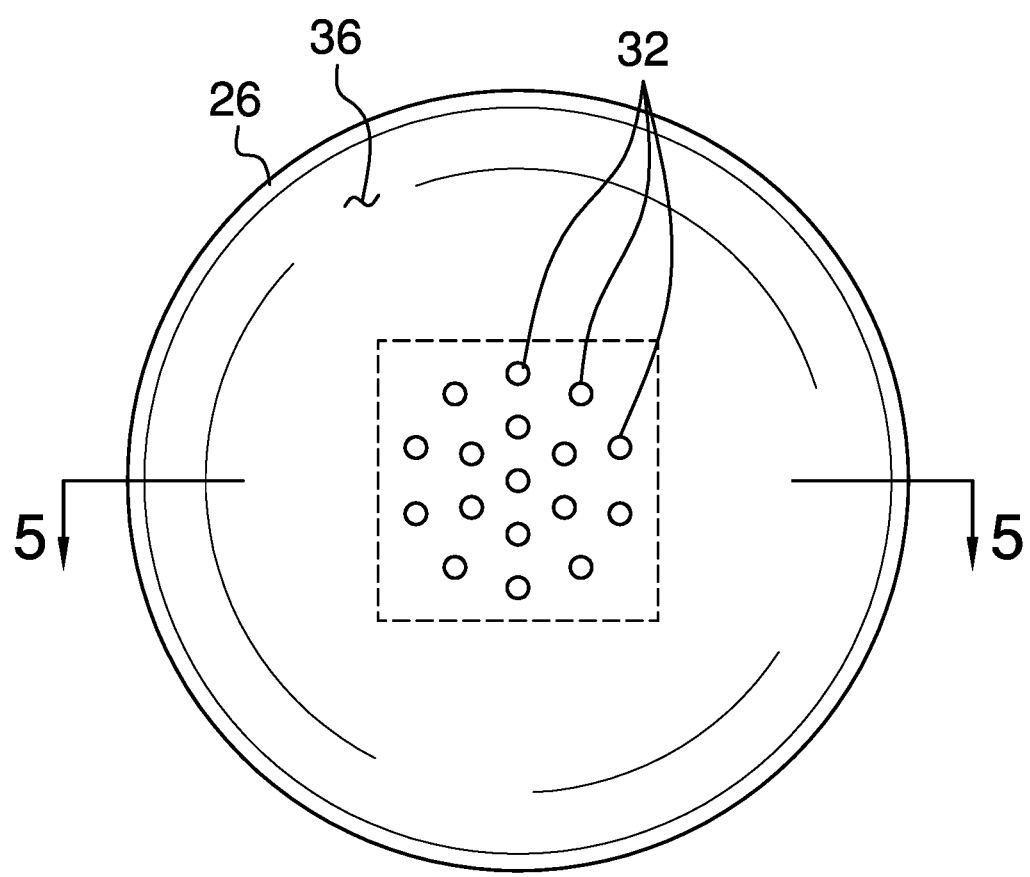
FIG. 4 is a top view of an embodiment of the disclosure.
Figure 5:
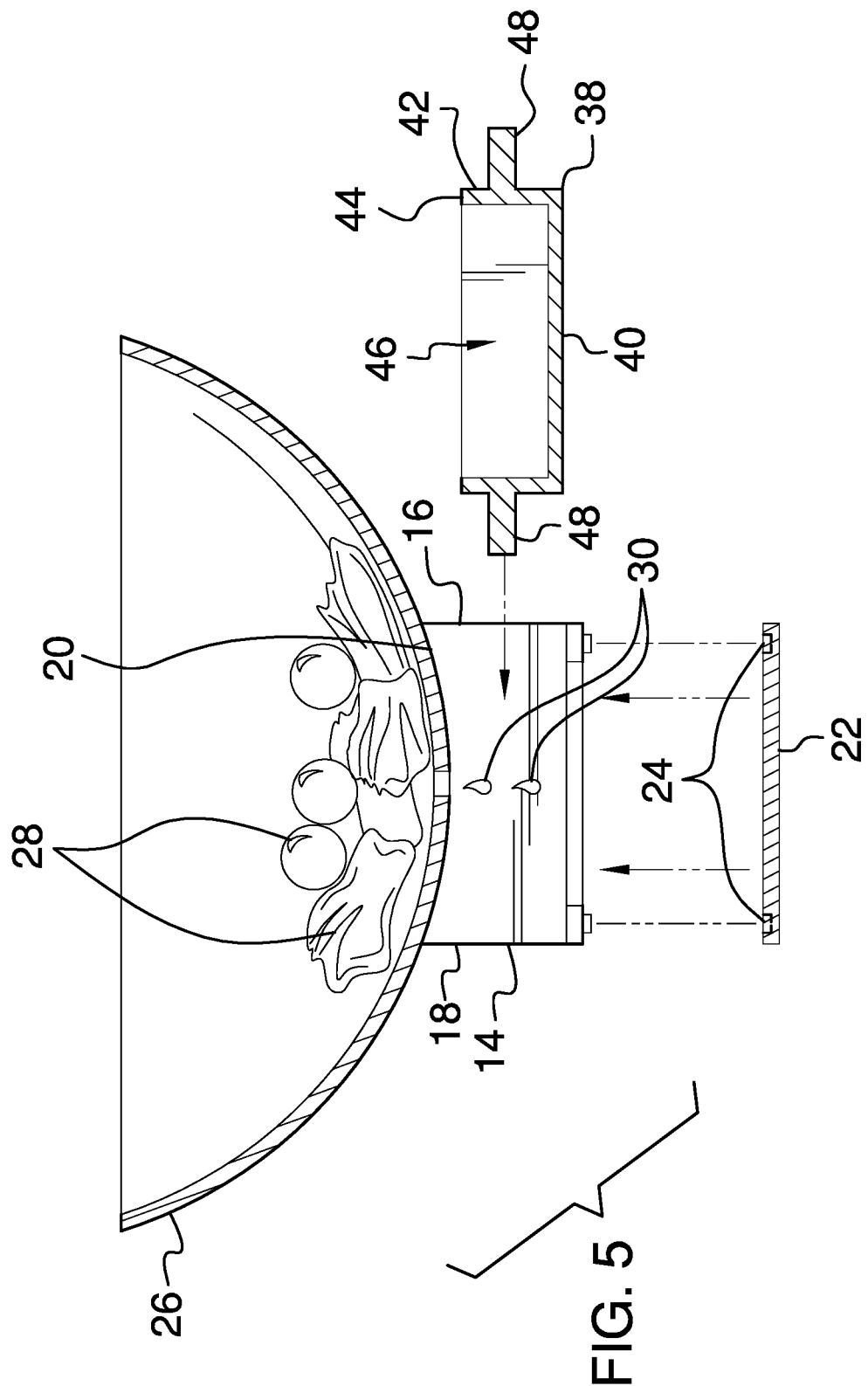
FIG. 5 is a cross sectional view taken along line 5-5 of FIG. 4 of an embodiment of the disclosure.

With reference now to the drawings, and in particular to FIGS. 1 through 5 thereof, a new draining device embodying the principles and concepts of an embodiment of the disclosure and generally designated by the reference numeral 10 will be described.

As best illustrated in FIGS. 1 through 5, the food draining assembly 10 generally comprises a housing 12 that may be positioned on a support surface 14. The housing 12 has a front side 16, a back side 18, a top side 20 and a bottom wall 22. Each of the front side 16 and the back side 18 are open to access an interior of the housing 12. The bottom wall 22 is removably coupled to the housing 12 and the support surface 14 may be a table or the like.

A plurality of couplers 24 is provided and each of the couplers 24 is coupled to the bottom wall 22. Each of the couplers 24 engages the housing 12 when the bottom wall 22 is positioned on the housing 12 to retain the bottom wall 22 on the housing 12. Each of the couplers 24 may comprise a peg and a corresponding well or any other means of frictional engagement to removably retain the bottom wall 22 on the housing 12.

A bowl 26 is provided and the bowl 26 is coupled to the housing 12. The bowl 26 may contain a food item 28 such as salad or any other food item 28 involving a liquid 30 that drains 32 from the food item 28. The bowl 26 has a plurality of drains 32 to pass the liquid 30 into the housing 12. The liquid 30 may be salad dressing, grease or any other liquid 30 associated with food.

The bowl 26 has a lower surface 34 and a top surface 36 and the lower surface 34 is attached to the top side 20 of the housing 12. The housing 12 is centrally positioned on the bowl 26 and each of the drains 32 extends through the top surface 36 and the lower surface 34. Each of the drains 32 is aligned with the housing 12.

A tray 38 is provided and the tray 38 is slidably positioned in the housing 12 to capture the liquid 30 that passes through the drains 32. The tray 38 has a basal wall 40 and a perimeter wall 42 extending upwardly therefrom. The perimeter wall 42 has a distal edge 44 to define an opening 46 into the tray 38 and the tray 38 is slidable outwardly from a selected one of the front side 16 and the back side 18 of the housing 12. A pair of grips 48 is provided and each of the grips 48 is coupled to the tray 38. Each of the grips 48 may be gripped thereby facilitating the tray 38 to be manipulated.

In use, the food item 28 is placed into the bowl 26 and the liquid 30 is poured onto the food item 28 or otherwise introduce to the food item 28. Excess liquid 30 passes through the drains 32 and is collected in the tray 38. The tray 38 is removed thereby facilitating the liquid 30 in the tray 38 to be re-used. The bowl 26 and the tray 38 are washed when the food item 28 is consumed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A food draining assembly being configured to capture a fluid being drained from a food item, said assembly comprising:
   a housing being configured to be positioned on a support surface, said housing having a front side, a back side, a top side and a bottom wall, each of said front side and said back side being open to access an interior of said housing, said bottom wall being removably coupled to said housing;
   a bowl being coupled to said housing wherein said bowl is configured to contain a food item, said bowl having a plurality of drains wherein each of said drains is configured to pass a liquid into said housing, said bowl having a lower surface and a top surface, said lower surface being attached to said top side of said housing, said housing being centrally positioned on said bowl, each of said drains extending through said top surface and said lower surface, each of said drains being aligned with said housing; and
   a tray being slidably positioned in said housing wherein said tray is configured to capture the liquid that passes through said drains.

2. The assembly according to claim 1, wherein
   said tray has a basal wall and a perimeter wall extending upwardly therefrom, said perimeter wall having a distal edge to define an opening into said tray, said tray being slidable outwardly from a selected one of said front side and said back side of said housing.

3. The assembly according to claim 2, further comprising a pair of grips, each of said grips being coupled to said tray wherein each of said grips is configured to be gripped thereby facilitating said tray to be manipulated.

4. A food draining assembly being configured to capture a fluid being drained from a food item, said assembly comprising:
   a housing being configured to be positioned on a support surface, said housing having a front side, a back side, a top side and a bottom wall, each of said front side and said back side being open to access an interior of said housing, said bottom wall being removably coupled to said housing;
   a bowl being coupled to said housing wherein said bowl is configured to contain a food item, said bowl having a plurality of drains wherein each of said drains is configured to pass a liquid into said housing, said bowl having a lower surface and a top surface, said lower surface being attached to said top side of said housing, said housing being centrally positioned on said bowl, each of said drains extending through said top surface and said lower surface, each of said drains being aligned with said housing;
   a tray being slidably positioned in said housing wherein said tray is configured to capture the liquid that passes through said drains, said tray having a basal wall and a perimeter wall extending upwardly therefrom, said perimeter wall having a distal edge to define an opening into said tray, said tray being slidable outwardly from a selected one of said front side and said back side of said housing; and
   a pair of grips, each of said grips being coupled to said tray wherein each of said grips is configured to be gripped thereby facilitating said tray to be manipulated.

* * * * *